United States Patent
Cohen et al.

[11] 3,924,130
[45] Dec. 2, 1975

[54] BODY EXPOSURE INDICATOR

[75] Inventors: Allen Cohen, Orlando, Fla.; Hugo J. Caligiuri, Washington, D.C.

[73] Assignee: The United States of America as represented by the Secretary of the Navy, Washington, D.C.

[22] Filed: Feb. 12, 1968

[21] Appl. No.: 706,750

[52] U.S. Cl. ............... 250/342; 250/338; 250/347; 340/258 B; 340/228 R; 346/33 B
[51] Int. Cl.² .................................. G01J 1/00
[58] Field of Search ..... 250/338, 203 CT, 347, 342; 340/258 B, 221, 251; 244/3.17; 343/5 MM

[56] References Cited
UNITED STATES PATENTS

| | | | |
|---|---|---|---|
| 2,951,160 | 8/1969 | McCartney | 250/338 |
| 3,290,506 | 12/1966 | Bertram | 250/203 CT |
| 3,336,585 | 8/1967 | Macouski | 340/248 B |

Primary Examiner—Maynard R. Wilbur
Assistant Examiner—S. C. Buczinski
Attorney, Agent, or Firm—J. C. Warfield, Jr.; J. W. Pease; J. F. Miller

[57] ABSTRACT

An infra-red detector is caused to scan a field of view periodically to detect warm bodied intruders or other personnel. Signals from the detector are compared with signals from a scene recorder containing a prerecorded picture of the same field of view made when no one was in the area. Any difference signal indicating a change in the field of view, such as might be caused by an enemy intruder in a combat area or by an overexposed trainee in a training exercise, actuates an alarm. A monitor display exhibits the scene viewed by the infra-red detector and an alarm recorder automatically records the scene when the alarm is actuated.

8 Claims, 3 Drawing Figures

BODY EXPOSURE INDICATOR

BACKGROUND OF THE INVENTION

The invention is in the field of detection and surveillance devices primarily intended for military applications. It is suitable for any observation and/or guard application such as plant protection, etc. Heretofore the extraordinary sensitivity of infra-red detection devices has been used in various ways to detect the presence of warm bodies, the preparation of thermograms for medical diagnosis, in target hit indicators, etc. However, no previous device is known wherein an infra-red detector has been used in conjunction with continuous comparison and display circuitry to maintain surveillance of a selected area.

SUMMARY OF THE INVENTION

An infra-red detector is caused to scan a selected area in a manner similar to a television camera to detect the presence of, for example, enemy troops in a combat zone or overexposed troops engaged in a training exercise. The video information developed by the infra-red detector is compared with information from a scene recorder which has recorded therein video information comprising a picture of the selected area made at a time when the area was unoccupied. When there is a difference between the video information from the scene recorder and that from the detector, a signal from the comparator actuates an alarm system to alert guard and/or command personnel. A monitor display exhibits the scene viewed by the detector. An alarm recorder records the scene immediately after the comparator generates an alarm signal, for display at a later time.

Figure 1:
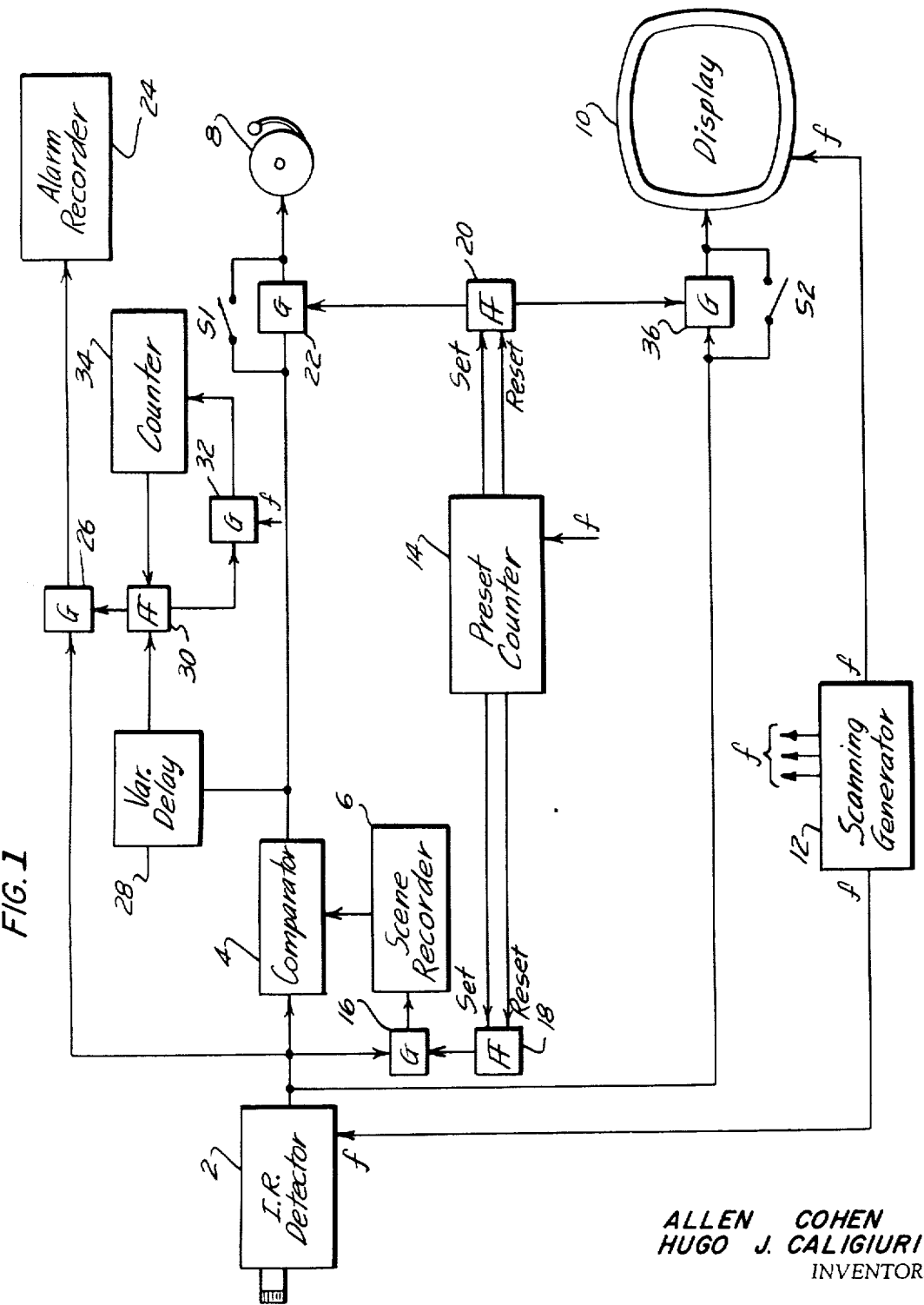
FIG. 1 shows the structural and functional interrelationships of the various circuit elements comprising the invention.

DESCRIPTION OF THE PREFERRED EMBODIMENT:

Referring now to FIG. 1 of the drawing, an infra-red detector 2 is shown with an output connected to an input of a comparator 4. A second input to comparator 4 originates from scene recorder 6. Infra-red detector 2 is arranged to scan a field of view, for example, an area which is under surveillance. This could be around a military encampment in one application of the invention. For example, the detector 2 might be trained on an area where enemy soldiers are expected to intrude, or on an area adjacent a plant or military base. Any exposed warm body such as that of an enemy in the area surveyed will be detected periodically by the detector 2 as it scans the area. Scene recorder 6 contains a record of the scene surveyed by detector 2, made when no intruders were present. This past record or view of the area is continuously compared in comparator 4 with the current view as represented by the information from infra-red detector 2. When there is a difference in the past and present scene such as would be caused by the presence of an intruder, comparator 4 passes an output signal through a closed switch S1 to an alarm 8. A gate 16 is connected between the output of infra-red detector 2 and the input of scene recorder 6. Gate 16 is opened and closed at selected intervals by an output voltage from a flip-flop 18. Flip-flop 18 in turn is controlled by selected outputs from a presettable counter 14 which is driven by an output frequency from a scanning generator 12. Thus the information in scene recorder 6 may be updated as often as desired by selecting a first count in counter 14 to set flip-flop 18 which in turn opens gate 16. Gate 16 will remain open until flip-flop 18 is reset by another selected count from counter 14, thereby permitting a current scene viewed by detector 2 to be stored in scene recorder 6. Alternatively, recorder 6 may be updated as desired by operating switches not shown. Recorder 6 is arranged to erase old information simultaneously with the recording of new information as is usual in the art. The frequency with which the information in scene recorder 6 is updated will in general depend on the use of the apparatus. For example, it might be necessary to update scene recorder 6 often when used in daytime in a tropical environment to compensate for the increasing temperature of rocks, structures, etc, which develops during the course of the day. In other circumstances, for example, nighttime in a cool locale, it might not be desired to update scene recorder 6 at all. Again, depending on the use of the invention and the type recorder and comparator employed, it might be desired to update scene recorder 6 continuously. In this case, scene recorder 6 would be selected and adjusted with a read-out trailing the read-in of information from detector 2 by an integral number of horizontal scans by detector 2. This will enable the comparison of information developed in a given horizontal sweep of detector 2 with the information developed in the same horizontal sweep a number of complete scans previously, the number of scans being selected to be equivalent to the lapse of a small period of time.

One unique feature of the invention which is of particular usefullness in training applications is shown in the drawing as a gate 22 controlled by a flip-flop 20 which is in turn controlled by the counter 14. These elements make it possible to train recruits in the essential skills of taking cover and remaining in concealment, as when crawling, observing, grenade throwing, etc. These skills are greatly emphasized in current warfare. When the switch S1 is opened in the line between the output of comparator 4 and alarm 8, no signal can reach the alarm 8 unless gate 22 is open. The convention used herein has an "open" gate passing signal and a "closed" gate blocking a signal. Gate 22 may be controlled by flip-flop 20 which is in turn controlled by presettable counter 14 in the same way as gate 16 and flip-flop 18, as previously described. Therefore, by selecting the counts at which presettable counter 14 will supply output voltages to the set and reset inputs of flip-flop 20, gate 22 may be maintained open and closed for any desired parts of the scanning cycle, or the equivalent number of horizontal scanning lines traversed by infra-red detector 2. When gate 22 is closed for a given number of scans of detector 2, no information can reach alarm 8 during the duration of those scans. Therefore, that portion of the scene viewed by detector 2 during the pertinent horizontal scans is effectively blanked out. This can be utilized in teaching "keep down" habits to soldiers by blanking out a lower section of a scene generated by scanning a training area containing trainees, with detector 2. If the soldiers stay below a prescribed level, say the height of a crawling man, they will be in the portion of the field of view which is blanked out and need not be concealed from the detector behind actual obstacles which are not always available on training fields. However, if a soldier should stand up or raise his head or an arm above the prescribed level which is included in the "blanked out" portion of the scene, a signal will be forwarded through gate 22 to alarm 8. Then an instructor may take appropriate action. This technique is also useful in teaching soldiers the arts of grenade throwing, and observation, without undue exposure to enemy fire. The same technique may be used to teach soldiers to avoid undue exposure when concealed behind a vertical obstacle or when staying within prescribed lateral limits such as on a path through a minefield. If counter 14 and flip-flop 20 operate at sufficient speed, a portion of each horizontal scan may be blanked or blocked by gate 22, thus creating a vertical blanked portion of the scene scanned by detector 2. Any lateral movement by a soldier-trainee beyond the prescribed limits will put a portion of his body within the unblocked portion of the scene and activate alarm 8.

In addition to alarm 8, a display device 10 monitors the scene surveyed by infra-red detector 2. Display 10 receives the information output from detector 2 over the connection shown through a gate 36. Gate 36 may be controlled by flip-flop 20 in the same manner as gate 22 in the input circuit to alarm 8. Thus in a training exercise designed to teach recruits to "keep down", part of the picture on display 10 can be blanked out in the manner previously described, if desired. Alternatively, all of the scene scanned by detector 2 may be continuously shown on display 10 by keeping gate 36 open or by closing a switch S2 bypassing gate 36. Either alternative might be preferred in a particular training exercise.

Figure 2:
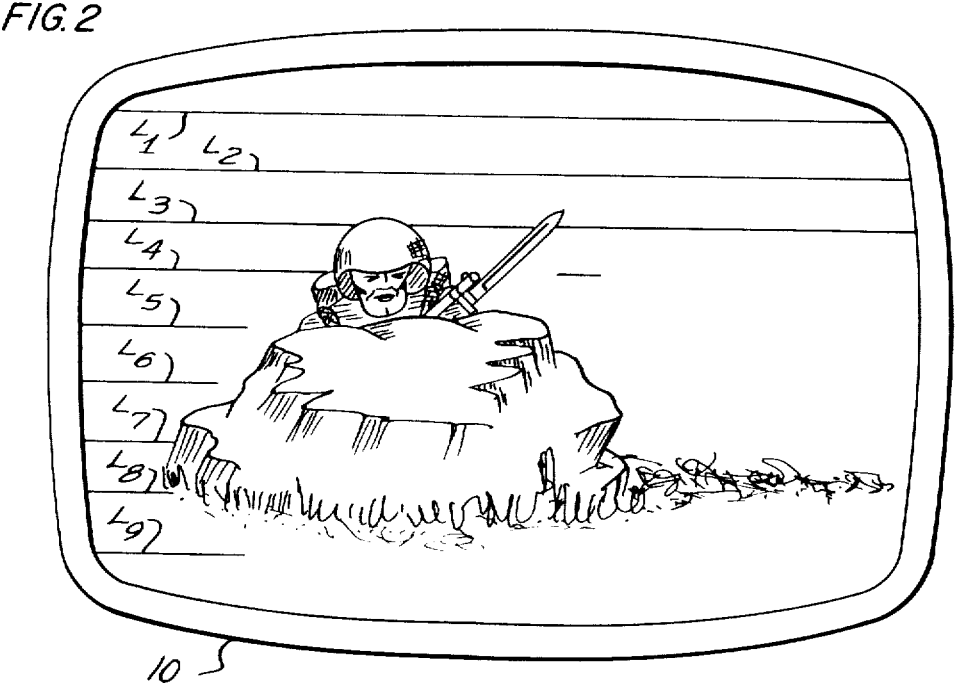
FIG. 2 shows an example of a field of view which might be surveyed.

FIG. 2 illustrates the principles involved in guard applications of the invention. Here an enemy soldier partially concealed behind a rock will be detected by scanning lines $L_3$ and $L_4$ of lines $L_1 - L_9$ which are representative of the numerous scanning lines traversed by the infra-red detector 2 and display 10 in the actual apparatus. Thus if a soldier shown were an approaching enemy trying to take advantage of available cover, he would be detected when any part of his body was exposed from his place of concealment. When the signal from infra-red detector 2 is compared with the prerecorded scene from scene recorder 6 which was made of the same area when no one was present, comparator 4 will have a signal output to alarm 8 as previously described.

Any of scanning Lines $L_1 - L_9$ may be blanked out when desired. If the soldier shown in FIG. 2 were completely exposed on a training field, no rock or other cover being available, and if it were desired to signal alarm 8 only when he raised part of his body above a given height, for example, the height of scanning line $L_5$ which is what is desired when training troops to keep down, then scanning lines $L_6 - L_9$ would be blanked out in the manner previously described. Therefore, no signal would be received by alarm 8 as long as a soldier-trainee stayed down below a prescribed level, even though he might be in full view of the infra-red detector. The same principles may be employed to teach the use of vertically concealing cover, such as tree trunks, etc., by blanking out a part of the horizontal scan lines, as previously described. Therefore, by use of the invention, military personnel may be trained in some of the most basic and essential techniques of modern warfare without subjecting the troops to the hazards of live gunfire, and without incurring the expense and complications thereof.

Figure 3:
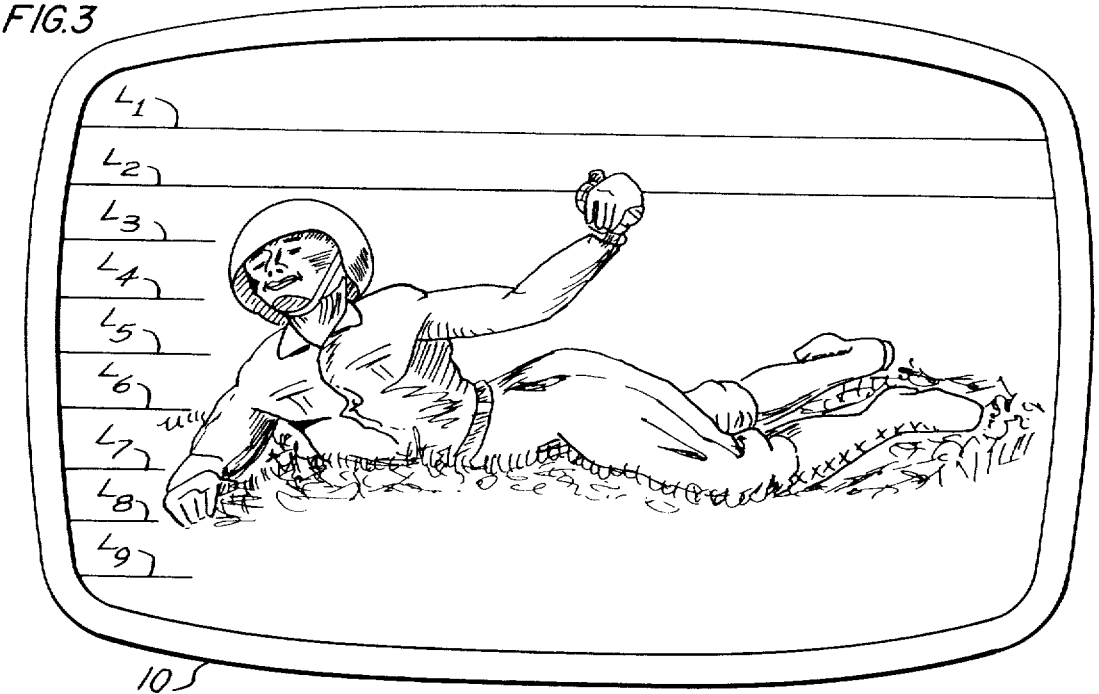
FIG. 3 illustrates the use of the invention to detect an overexposed trainee in a "keep down" training exercise.

FIG. 3 shows a trainee engaged in keep down drill. This type of training has proven to be very valuable in teaching recruits to avoid over-exposure to enemy fire and observation when crawling and when rising up slightly to observe, or for example, to throw a grenade. Here the detector 2 is scanning a training area containing no natural cover. The troops are required to remain below a particular level, shown here as line $L_3$. In this exercise all the lines below line $L_3$ are blanked out. Therefore, even though the trainee is fully exposed to observation by the scanner, no signal will be generated by comparator 4 to actuate alarm 8 unless some part of the trainee's body is raised above line $L_3$.

One feature of the invention which is of great value in locating an intruder in the field of view or in pinpointing a particular trainee who has raised up part of his body above a predetermined level, is shown as an alarm recorder 24 in FIG. 1. In practice, it is difficult for a guard or instructor to concentrate continuously on watching display 10 to apprehend an intruder or a careless trainee. Usually the sound or signal from alarm 8 causes the guard or instructor to look quickly at display 10 to try to see who or what caused the alarm. However, many times an offending trainee realizes that he has raised himself up above the prescribed level and lowers himself so quickly that by the time the instructor looks at display 10 it is too late to apprehend the offender. In the case of an enemy intruder, it is usual for an enemy to expose himself only briefly, as by raising his head to look over an obstacle as illustrated in FIG. 2, and then lowering it quickly. The alarm recorder 24 and its supporting structure is designed to solve this problem by recording a complete picture of the field of view observed by detector 2 immediately after comparator 4 generates an output signal. This signal goes through a variable delay 28 and sets a flip-flop 30. Flip-flop 30 when set generates an output voltage which opens gates 26 and 32. When gate 26 is opened, the video output information from detector 2 is fed to alarm recorder 24 for a predetermined length of time sufficient to record a complete picture of the area surveyed by detector 2, including the intruder or trainee whose exposure to the detector caused the alarm signal. This length of time will comprise an equivalent number of scans by detector 2, the number of which is determined by the type recorder, display, and detector elements selected. This number is counted off by a counter 34 which may be a presettable counter. Counter 34 receives count pulses from scanning generator 12 over an input lead labeled $f$ and through the gate 32 which is opened by flip-flop 30 when gate 26 is opened. When counter 34 counts to the predetermined number, it resets to the zero count position and a counter output signal is fed back over the line shown to reset flip-flop 30 which then closes both gates 26 and 32. This stops the flow of video information from detector 2 to alarm recorder 24 and the count pulses from scanning generator 12 to counter 34. Guard or instructor personnel may then observe the picture recorded in alarm recorder 24 whenever desired. Since the scene is recorded in recorder 24 immediately after the alarm signal occurs, the intruder or trainee causing the alarm will not have time to take cover before his position is recorded. Alarm recorder 24 may be an available video recorder with integral display means or a video record may be shown on display 10 when desired by operating circuitry not shown. Thus guard or instructor personnel can easily pinpoint the location of an intruder even though he has withdrawn behind cover such as the boulder shown in FIG. 2 by the time the guard or instructor glances at display 10.

The invention is not limited to any particular circuit elements. The elements employed may be well known and readily available. For example, the infra-red detector might comprise an indium antimonide detector mounted in a stainless steel dewar flask and cooled with liquid nitrogen. An electronic preamplifier may be built into the combination to boost the small detector signal. The response time of such a detector is in the microsecond region. The temperature resolution is 0.5° C or less. This unit may be installed in a Barnes Engineering Company modified T6 radiometer wherein a motor driven multi-sided prism is installed for scanning in a horizontal direction and a flat front surfaced mirror operated by a fast acting motor driven cam is used for scanning in the vertical direction. Recorder 6 may be any suitable recorder such as a tape or disk recorder with a suitable arrangement of recording, read, and erase heads. The display 10 may be of any suitable type, for example, a storage type CRT containing an integral flood gun. When the vertical repetition rate is five cycles per second, an erase cycle may precede the rewrite cycle to reduce flicker. Alarm 8 is shown as a simple bell in the drawing for purposes of illustration. In practice alarm 8 can be any desired alarm system.

Scanning generator 12 furnishes horizontal and vertical scanning voltages at selected frequencies to detector 2 and display 10, counting frequencies to counters 14 and 34, and synchronizing and/or driving voltages to other elements such as the recorders and comparator in a manner well known in the art. All connecting lines from scanning generator 12 to all the elements are not shown since they would needlessly clutter the drawing and such connections are well known. Where these lines are shown, as the connections from 14 to detector 2 and display 10, the single line shown represents a cable containing sufficient wires to carry the different required frequencies, i.e., the horizontal and vertical scanning frequencies. Elements such as gate 32 and counter 14 are shown with an arrow-headed line attached and labeled *f* which indicates a connection between the element and scanning generator 14 to supply the element with a voltage input of an appropriate frequency. The lines connecting the several elements in FIG. 1 are not labeled since the connections are obvious and such labels would needlessly clutter the drawing and complicate the description thereof.

Many variations and modifications of applicant's invention may occur to those skilled in the art when apprised of the above disclosure. Therefore it is to be understood that applicant's invention is not confined to the disclosed embodiment but is limited only by the following claims.

The invention described herein may be manufactured and used by or for the Government of the United States of America for governmental purposes without the payment of any royalties thereon or therefor.

What is claimed is:

1. In a detector system for detecting the presence of warm bodies in a selected area, the improvement comprising:

detector means for periodically scanning said selected area to detect warm bodies therein, recorder means for periodically recording the signals developed by said detector means, comparator means for comparing the output signals from said detector means with previous signals from said detector means stored in said recorder means, alarm means for generating an alarm signal responsive to a difference signal from said comparator means when said detector output signal differs from said previous detector output signal recorded in said recorder means, and first gating means for selectively gating said difference signal from said comparator means to said alarm means.

2. The apparatus of claim 1 and including second gating means for selectively gating the output signal from said detector means to said recorder means, and control means for controlling said first and second gating means.

3. The apparatus of claim 2 wherein said control means comprise a presettable counter and first and second flip-flops for selectively controlling said first and second gating means respectively.

4. The apparatus of claim 3 and including display means for displaying signals form said detector means as the scene viewed by said detector means.

5. The apparatus of claim 4 and including scanning generator means for furnishing synchronized output signals to control said detector means, control means, and display means, and means for selectively gating the signal from said detector means to said display means.

6. The apparatus of claim 5 and including an alarm recorder means and means for selectively gating the output signal of said detector means to said alarm recorder means.

7. The apparatus of claim 6 and including second control means responsive to an output signal from said comparator means to gate the output signal of said detector means to said alarm recorder means.

8. The apparatus of claim 7 wherein said second control means comprise a delay means, a switching means, counting means, a third gating means, and a fourth gating means, said delay means being connected to transmit a signal from said comparator means to said switching means, said switching means being connected to control said third gating means and said fourth gating means, said third gating means being connected to control the flow of output signals from said detector means to said alarm recorder means, said fourth gating means being connected to control the flow of count signals to said counting means, said counting means being connected to furnish a control signal to said switching means, whereby an output signal from said counting means is furnished to said switching means to cause said switching means to close said third and said fourth gating means.

* * * * *